United States Patent
Yu

(10) Patent No.: US 10,582,080 B2
(45) Date of Patent: Mar. 3, 2020

(54) IMAGE FORMATION APPARATUS, SYSTEM, METHOD AND COMPUTER READABLE STORAGE MEDIUM

(71) Applicant: Konica Minolta, Inc., Chiyoda-ku, Tokyo (JP)

(72) Inventor: Kazutoshi Yu, Kobe (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 16/217,177

(22) Filed: Dec. 12, 2018

(65) Prior Publication Data
US 2019/0191049 A1 Jun. 20, 2019

(30) Foreign Application Priority Data
Dec. 14, 2017 (JP) .................................. 2017-239429

(51) Int. Cl.
*G06F 3/12* (2006.01)
*H04N 1/00* (2006.01)

(52) U.S. Cl.
CPC ..... *H04N 1/00973* (2013.01); *H04N 1/00244* (2013.01); *H04N 1/00941* (2013.01); *H04N 2201/0094* (2013.01)

(58) Field of Classification Search
CPC ........... H04N 1/00973; H04N 1/00244; H04N 1/00941; H04N 2201/0094
See application file for complete search history.

(56) References Cited

U.S. PATENT DOCUMENTS

| 2003/0142351 A1* | 7/2003 | Sakura | G06F 8/65 358/1.15 |
| 2006/0230261 A1* | 10/2006 | Yoshimura | G06F 9/4411 713/1 |
| 2008/0288935 A1* | 11/2008 | Kawaguchi | G06F 8/65 717/172 |
| 2009/0109477 A1* | 4/2009 | Oomura | G06F 3/1222 358/1.15 |
| 2009/0251730 A1* | 10/2009 | Yamaguchi | H04N 1/00204 358/1.15 |
| 2014/0282481 A1* | 9/2014 | Ohara | G06F 8/65 717/172 |

FOREIGN PATENT DOCUMENTS

| JP | 2014038368 A | 2/2014 |
| JP | 2017037620 A | 2/2017 |

* cited by examiner

*Primary Examiner* — Moustapha Diaby
(74) *Attorney, Agent, or Firm* — Buchanan Ingersoll & Rooney PC

(57) ABSTRACT

A system includes: an information processing device having a cooperative application; one or more image formation apparatuses operating in cooperation with the information processing device; and a server configured to distribute the cooperative application via the image formation apparatus. The image formation apparatus is configured to: receive from the information processing device application information which identifies the cooperative application; and when the firmware is updated, receive from the server a cooperative application identified by the application information and corresponding to an updated version of the firmware.

9 Claims, 11 Drawing Sheets

FIG.7

| | USER ID | DRIVER TYPE | VERSION DATA | FIRMWARE TYPE | UPDATE DATA | |
|---|---|---|---|---|---|---|
| R | U(1) | D(1) | Vr(1) | ⋮ | OK | |
| R | U(2) | D(2) | Vr(2) | ⋮ | NG | |
| | ⋮ | ⋮ | ⋮ | ⋮ | ⋮ | |

700, 701, 702, 703, 704, 333

IMAGE FORMATION APPARATUS, SYSTEM, METHOD AND COMPUTER READABLE STORAGE MEDIUM

Japanese Patent Application No. 2017-239429 filed on Dec. 14, 2017, including description, claims, drawings, and abstract the entire disclosure is incorporated herein by reference in its entirety.

BACKGROUND

Technological Field

The present disclosure relates to an image formation apparatus, a system, a method, and a computer-readable storage medium, and in particular, to an image formation apparatus, a system, a method, and a computer readable storage medium that operate in cooperation with an information processing device.

Description of the Related Art

There is a case where an image formation apparatus such as a printer, a copier or a combination thereof, or a MFP (Multi-Function Peripherals), is used by an information processing device that communicates with the image formation apparatus.

In this case, a cooperative application that causes the information processing device to operate in cooperation with the image formation apparatus, such as a printer driver installed in the information processing device, is started. Data from the cooperative application of the information processing device is processed by firmware of the image formation apparatus.

When used in such a manner, it is necessary that the version of the cooperative application installed in the information processing device matches the version of the firmware of the image formation apparatus such as an MFP. If they do not match, there may arise such problems that some function of the image formation apparatus cannot be used via the information processing device or a new function of the image formation apparatus cannot be used.

Furthermore, while a technique for automatically providing the latest version of firmware to an image formation apparatus such as an MFP has been proposed, the aforementioned mismatch tends to easily arise as a cooperative application corresponding to the latest version of firmware is not provided together with the latest version of firmware.

Japanese Laid-Open Patent Publication Nos. 2017-37620 and 2014-38368 disclose installing software such as a printing driver in a device in association with firmware.

SUMMARY

According to Japanese Laid-Open Patent Publication Nos. 2017-37620, however, a driver of a printing device is selected by a user's operation. Therefore, when firmware of the printing device is updated, the user needs to select again a driver corresponding to the updated firmware. Furthermore, according to Japanese Laid-Open Patent Publication No. 2014-38368, a driver management unit of a management server manages a driver of a peripheral device of a client and a firm corresponding to the peripheral device. Therefore, it is necessary to specially provide a server for managing information regarding the driver of the peripheral device.

Therefore, there is a need for a simple configuration for distributing a cooperative application corresponding to an updated version of firmware of an image formation apparatus when the firmware is updated.

To achieve at least one of the abovementioned objects, according to an aspect of the present disclosure, a system reflecting one aspect of the present disclosure comprises an information processing device having a storage configured to store a cooperative application; one or more image formation apparatuses configured to operate in cooperation with the information processing device; and a server configured to distribute the cooperative application via the image formation apparatus, the one or more image formation apparatuses each including: a hardware processor; a communication circuit configured to communicate with the information processing device; a communication interface circuit configured to communicate with the server; and a storage configured to store firmware, the hardware processor being configured to: receive from the information processing device application information which identifies the cooperative application; and when the firmware is updated, receive from the server a cooperative application identified by the application information and corresponding to an updated version of the firmware.

According to one example of the present disclosure, an image formation apparatus operates in cooperation with an information processing device having a storage configured to store a cooperative application, and comprises: a hardware processor; a communication circuit configured to communicate with the information processing device; a communication interface circuit configured to communicate with a server which distributes the cooperative application via the image formation apparatus; and a storage configured to store firmware, the hardware processor being configured to: receive from the information processing device application information which identifies the cooperative application; and when the firmware is updated, receive from the server a cooperative application identified by the application information and corresponding to an updated version of the firmware.

According to one example of the present disclosure, a method is a method for controlling an image formation apparatus configured to operate in cooperation with an information processing device having a cooperative application. The image formation apparatus comprises: a communication circuit configured to communicate with the information processing device; a communication interface configured to communicate with a server which distributes the cooperative application via the image formation apparatus; and a storage configured to store firmware. The method comprises: receiving from the information processing device application information which identifies the cooperative application; and when the firmware is updated, receiving from the server a cooperative application identified by the application information and corresponding to an updated version of the firmware.

According to one example of the present disclosure, there is provided a computer readable storage medium having a program stored thereon for causing a computer to perform the above method.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 1 is a diagram showing a schematic configuration of a system according to an embodiment.

FIG. 7 is a diagram schematically showing an example of a configuration of a driver list 333 according to the present embodiment.

DETAILED DESCRIPTION OF EMBODIMENTS

Hereinafter, one or more embodiments of the present invention will be described with reference to the drawings. However, the scope of the invention is not limited to the disclosed embodiments. In the following description, identical parts and components are identically denoted. Their names and functions are also identical. Accordingly, they will not be described redundantly <A. Outline of Disclosure>

Figure 1:
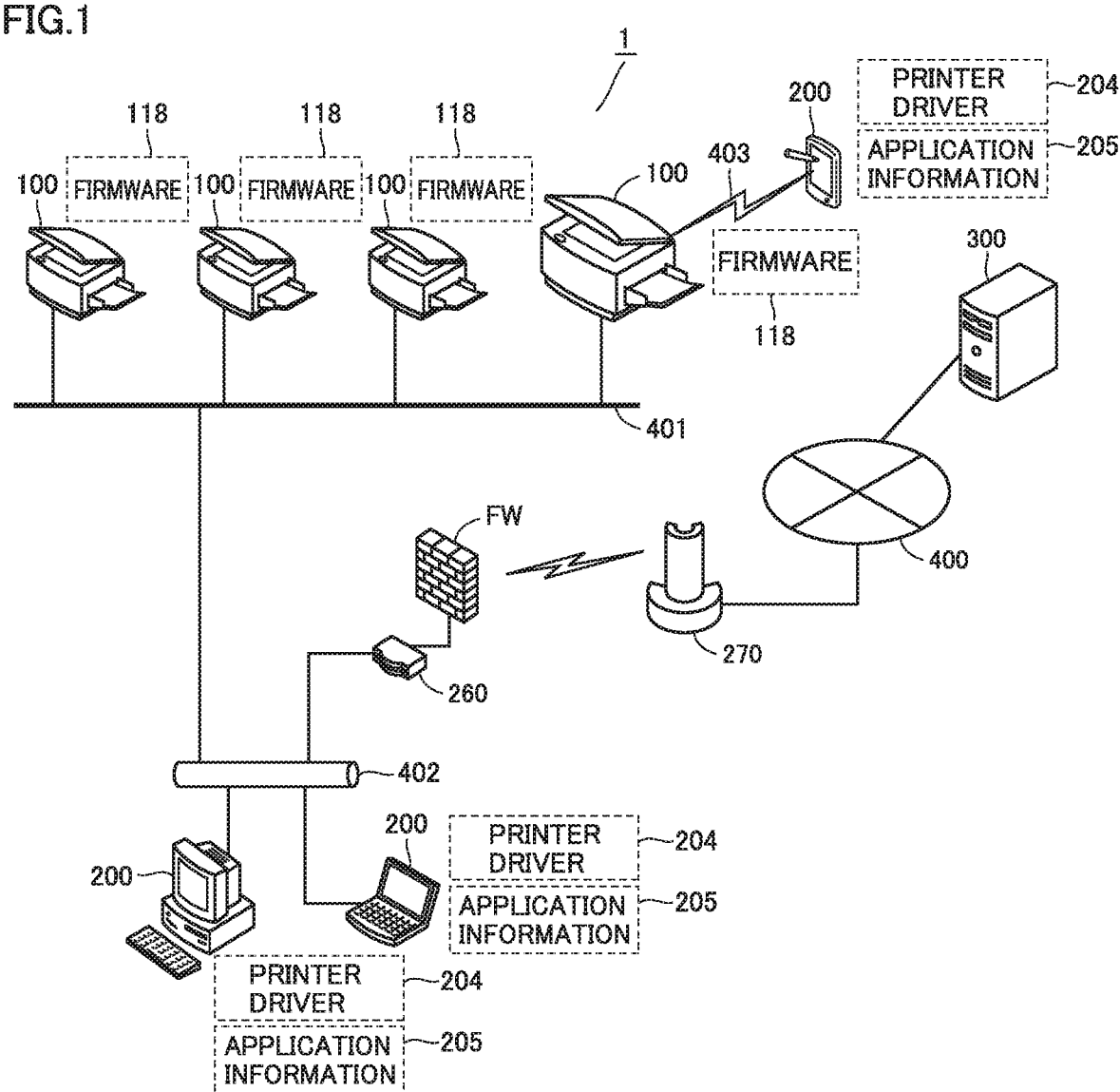

The present disclosure will be outlined with reference to FIG. 1. FIG. 1 is a diagram showing a schematic configuration of a system according to the present embodiment.

With reference to FIG. 1, a system 1 comprises a plurality of image formation apparatuses 100, a plurality of information processing devices 200, wired or wireless networks 400, 401, 402 and 403, a server 300, a firewall FW, and relays 260 and 270. Although system 1 comprises the plurality of image formation apparatuses 100 and the plurality of information processing devices 200, a single image formation apparatus 100 and a single information processing device 200 may be provided. Networks 401 and 402 include a LAN (Local Area Network) or a global network. Network 400 includes various networks such as the Internet.

Image formation apparatuses 100 are communicably connected to each other via network 401. Information processing device 200 performs wired or wireless communication with image formation apparatus 100 via networks 401 and 402. Further, image formation apparatus 100 or information processing device 200 communicates with server 300 on network 400 via relays 260 and 270 and firewall FW. Image formation apparatus 100 may be an apparatus having at least one or more image processing functions, and can include, for example, an MFP, a printer, a facsimile transceiver, a copy machine, and the like. Information processing device 200 has a configuration corresponding to a computer, and includes a device at least including a memory that stores a program, a processor that executes the program, a communication circuit, an instruction input device, and the like. Information processing device 200 can include a stationary type or a portable type. Server 300 can include, for example, a cloud server.

In system 1, information processing device 200 has a printer driver 204 which is an embodiment of a cooperative application installed therein in order to operate in cooperation with image formation apparatus 100. Similarly, image formation apparatus 100 for example has firmware 118 installed therein as an application in order to operate in cooperation with information processing device 200. Image formation apparatus 100 uses firmware 118 to process data received by image formation apparatus 100 from printer driver 204. Image formation apparatus 100 receives from each information processing device 200 application information 205 including the type and version (or edition) of each printer driver 204 of information processing device 200 and the type of firmware 118 corresponding thereto. Image formation apparatus 100 thus collects application information 205 of printer driver 204 from each information processing device 200. Further, application information 205 may include an environment in which printer driver 204 is used (for example, identification information of an OS (operating system) of information processing device 200).

Image formation apparatus 100 transmits to server 300 application information 205 received (or collected) from each information processing device 200. When image formation apparatus 100 has firmware 118 updated, server 300 distributes a version of the printer driver corresponding to the updated version of firmware 118, based on application information 205 received from image formation apparatus 100. The corresponding version of the printer driver is distributed to each information processing device 200 via image formation apparatus 100.

Such distribution allows a simple configuration to distribute a version of the printer driver corresponding to the updated version of the firmware to information processing device 200 without a user operation as done in Japanese Laid-Open Patent Publication No. 2017-37620 or a driver manager by a server device as in Japanese Laid-Open Patent Publication No. 2014-38368. That is, image formation apparatus 100 collects application information 205 from each information processing device 200, and server 300 distributes via image formation apparatus 100 to information processing device 200 a version of the printer driver identified by application information 205 collected by image formation apparatus 100, that corresponds to the updated version of firmware 118. Thus, when firmware 118 is updated, a version of the printer driver corresponding to the updated version of the firmware can be provided to information processing device 200 without requiring user operation or driver management by server 300.

In the present embodiment, the contents of the firmware can be updated, for example, by the provider of the firmware. Likewise, the contents of the printer driver can also be updated, for example, by the provider of the printer driver. An update of the printer driver can include an update for matching the contents of an updated version of the firmware when the firmware is updated. Furthermore, how many times such updating has been done is specified by an "edition" or a "version."

Further, according to the present embodiment, different types of printer drivers 204 can be installed in information processing device 200. The types of printer drivers 204 are different depending on settings for printer driver 204, such as the corresponding firmware's identifier, a printing sheet size, monochrome/color, etc. According to the present embodiment, printer driver 204 has types including "standard" which indicates that settings are of a predetermined standard, and "customize." "Customize" means re-setting (or changing) the standard settings of printer driver 204 in accordance with the user's preference and usage. In the present embodiment, for example, the user can operate information processing device 200 to customize the standard settings of printer driver 204 to generate a "customized" type of printer driver 204.

In the present embodiment, in order to match a version of firmware 118 with that of printer driver 204 serving as a cooperative application, as has been described above, when firmware 118 is updated a version of the printer driver corresponding to the updated version of the firmware (hereinafter also referred to as a corresponding printer driver) is distributed and installed as printer driver 204 in information processing device 200.

According to the present embodiment, the cooperative application is not limited to printer driver 204, and may include various applications started in cooperation with firmware 118. Further, while in the present embodiment, data received from the cooperative application by image formation apparatus 100 and processed by firmware 118 is, for example, print data generated by printer driver 204, it is not limited thereto.

In the present embodiment, installation refers to a process of storing an application (including the cooperative application and the firmware) in a storage unit. More specifically, installation indicates that these applications are stored in a storage unit and set to be executable (or readable) by a CPU. For example, the application is decompressed or the like to be set to be executable (or readable).

Printer driver 204 includes software operative in information processing device 200 in response to the user's print instruction (or an external print instruction) for forming print data that can be processed by image formation apparatus 100 using firmware 118 or the like.

Firmware 118 is software for accessing hardware resources of information processing device 200 to implement each function. For example, firmware 118 processes print data received from information processing device 200 while accessing the hardware resources according to its settings.

In system 1 according to the present embodiment, firmware 118 stored in image formation apparatus 100 can be updated by installing an updated version of the firmware supplied from an external device including server 300. Printer driver 204 stored in information processing device 200 can be updated by installing as printer driver 204 a corresponding printer driver supplied from an external device including server 300 or image formation apparatus 100.

<B. Hardware Configuration of Image Formation Apparatus 100>

Figure 2:
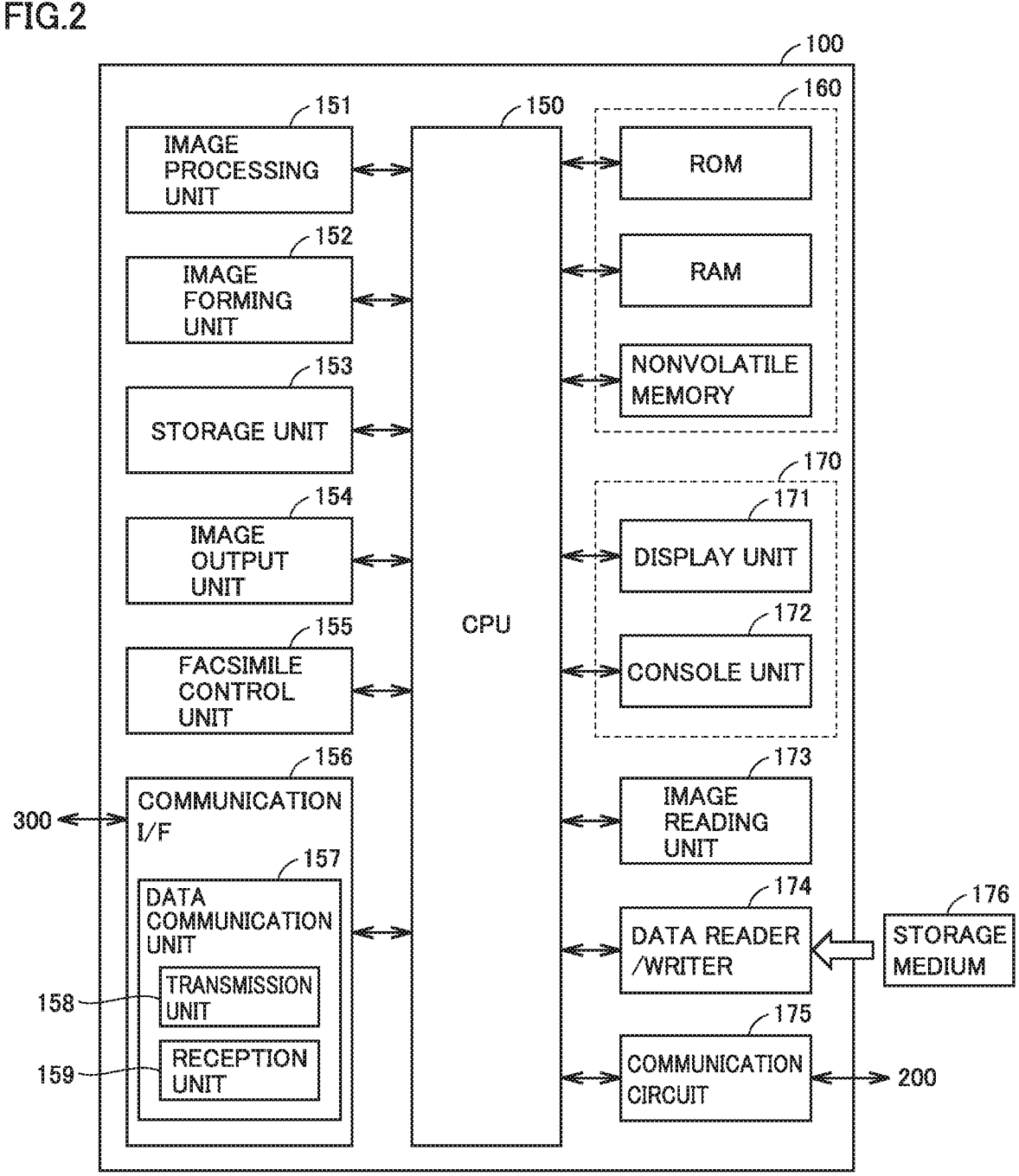
FIG. 2 is a diagram schematically showing an example of a configuration of hardware of an image formation apparatus 100 according to the present embodiment.

FIG. 2 is a diagram schematically showing an example of a configuration of hardware of image formation apparatus 100 according to the present embodiment. With reference to FIG. 2, image formation apparatus 100 comprises a CPU (Central Processing Unit) 150 corresponding to a control unit for controlling image formation apparatus 100, a storage unit 160 for storing a program and data, an information input/output unit 170, a communication interface (I/F) 156 for communicating with server 300 via networks 400, 401 and 402, a communication circuit 175 for communicating with information processing device 200, and a variety of types of processing units.

Storage unit 160 includes a ROM (Read Only Memory) for storing a program executed by CPU 10, a RAM (Random Access Memory) serving as a working area when the program is executed by CPU 10, a nonvolatile memory, and the like.

Input/output unit 170 includes a display unit 171 including a display, and a console unit 172 operated by a user to input information to image formation apparatus 100. Display unit 171 and console unit 172 may be integrally provided as a touch panel.

Communication I/F 156 is configured to include a circuit such as a NIC (Network Interface Card). Communication I/F 156 includes a data communication unit 157 for communicating with an external device including server 300 via a network. Data communication unit 157 includes a transmission unit 158 for transmitting data to an external device including server 300 via a network and a reception unit 159 for receiving data from an external device including server 300 via a network.

Communication circuit 175 includes a communication circuit such as a LAN (Local Area Network) or NFC (Near Field Communication) for communicating with information processing device 200.

The various processing units include an image processing unit 151, an image forming unit 152, a storage unit 153 such as a hard disk for storing various types of data including image data, an image output unit 154 for controlling a printer (not shown), a facsimile control unit 155 for controlling a facsimile circuit (not shown), an image reading unit 173 for optically reading an original document to obtain image data, and a data reader/writer 174 to which a storage medium 176 is detachably attached.

Image output unit 154 drives the printer by using print data 50, which will be described later, received from information processing device 200. Data reader/writer 174 has a circuit for reading a program or data from storage medium 176 attached thereto, and a circuit for writing data to storage medium 176.

<C. Hardware Configuration of Server 300)

Figure 3:
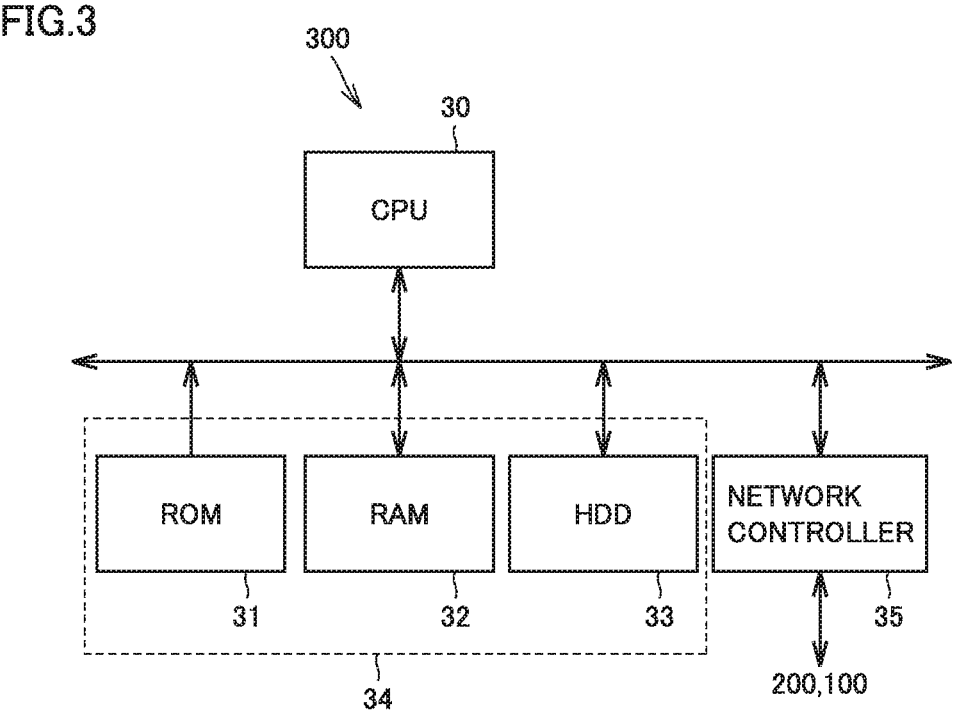
FIG. 3 is a diagram schematically showing an example of a hardware configuration of a server 300 according to the present embodiment.

FIG. 3 is a diagram schematically showing an example of a hardware configuration of server 300 according to the present embodiment. Referring to FIG. 3, server 300 includes a CPU 30 for controlling server 300, a storage unit 34, and a network controller 35. Storage unit 34 includes a ROM 31 for storing a program executed by CPU 30 and data, RAM 32, and an HDD (Hard Disk Drive) 33 for storing various types of information. Network controller 35 communicates with image formation apparatus 100 or information processing device 200. RAM 32 includes an area for storing various types of information, and a working area used in executing a program by CPU 30. Network controller 35 includes a circuit such as an NIC.

<D. Hardware Configuration of Information Processing Device 200>

Figure 4:
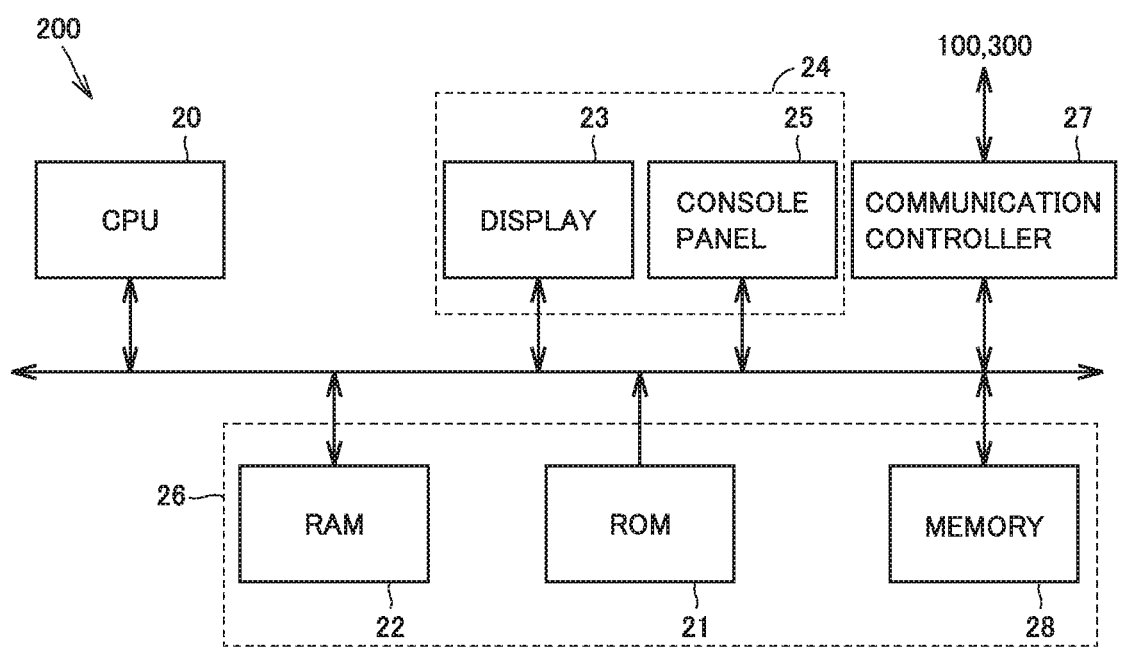
FIG. 4 is a diagram schematically showing an example of a hardware configuration of an information processing device 200 according to the present embodiment.

FIG. 4 is a diagram schematically showing an example of a hardware configuration of information processing device 200 according to the present embodiment. With reference to FIG. 4, information processing device 200 includes a CPU 20 corresponding to a control unit for controlling information processing device 200, a display 23, a console panel 25 operated by a user to input information to information processing device 200, a storage unit 26, and a communication controller 27. Storage unit 26 includes a ROM 21 for storing a program executed by CPU 20 and data, a RAM 22, and a memory 28 including a hard disk device. Display 23 and console panel 25 may be integrated together in the form of a touch panel 24 and thus provided. Communication controller 27 includes a communication circuit such as an NIC or a LAN circuit for communicating with another information processing device 200, image formation apparatus 100 or server 300.

<E. Structure of Print Data>

Figure 5:
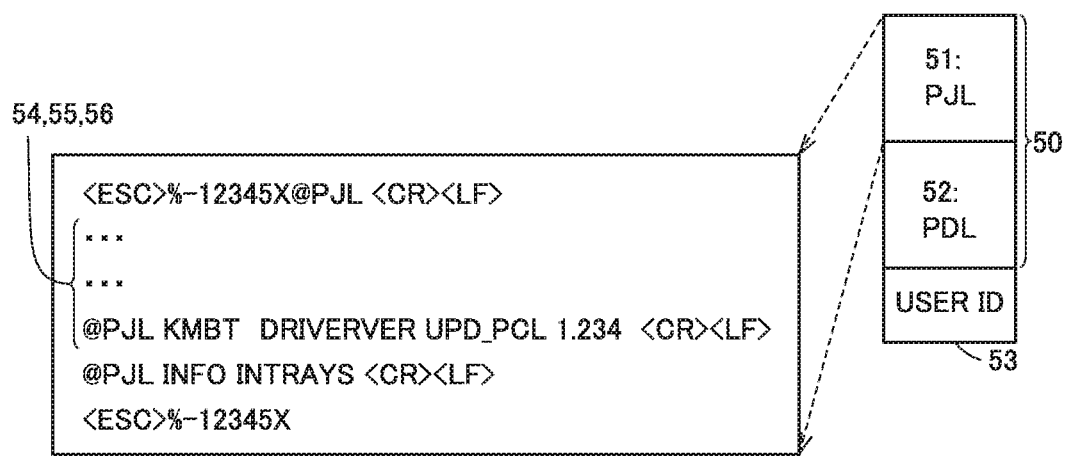
FIG. 5 is a diagram schematically showing a configuration of print data 50 according to the present embodiment.

FIG. 5 is a diagram schematically showing a configuration of print data 50 according to the present embodiment. Printer driver 204 according to the present embodiment generates print data 50 for causing a printer to print an image. Referring to FIG. 5, print data 50 includes PJL data 51, PDL (page description language) data 52, and a user ID 53 for identifying a user of print data 50. In the present embodiment, printer driver 204 converts data to be printed into PDL data 52, and PDL data 52 is transmitted to image formation apparatus 100 as print data 50 in which PJL data 51 and user ID 53 are added to PDL data 52. PJL data 51 is command data described in the PJL format. The data to be printed can include data created in information processing device 200 using an application (for example, word processing software which is a document editing application, spreadsheet software and the like). User ID 53 is an identifier of the user of print data 50, and includes, for example, a login name of the user of information processing device 200.

Referring to FIG. 5, for PJL data 51, various instructions that do not directly affect PDL data 52 are defined. For example, when functions such as stapling and punching are used, command data for the functions is described. In the present embodiment, PJL data 51 includes a type of the PDL, and version data 54 indicating a version of printer driver 204, a type 55 of printer driver 204, and a type 56 of firmware 118 corresponding to printer driver 204, that application information 205 of printer driver 204 has. It should be noted that print data 50 may be transmitted as a job (a print job) to be processed by image formation apparatus 100.

Print data 50 is processed by image formation apparatus 100. More specifically, image output unit 154 of image formation apparatus 100 develops PDL data 52 of print data 50 as bit map data on the RAM of storage unit 160 by using firmware 118. A printer (not shown) of image output unit 154 performs a printing process on a printing sheet in accordance with the bitmap data (PDL data 52), and performs a prescribed process (such as a stapling process) on the printing sheet or the like in accordance with PJL data 51.

In addition, application information 205 included in print data 50, that is, version data 54 of printer driver 204, type 55 of printer driver 204, and type 56 of firmware, is transmitted to server 300 by image formation apparatus 100.

<F. Functional Configuration of Information Processing Device 200>

Figure 6:
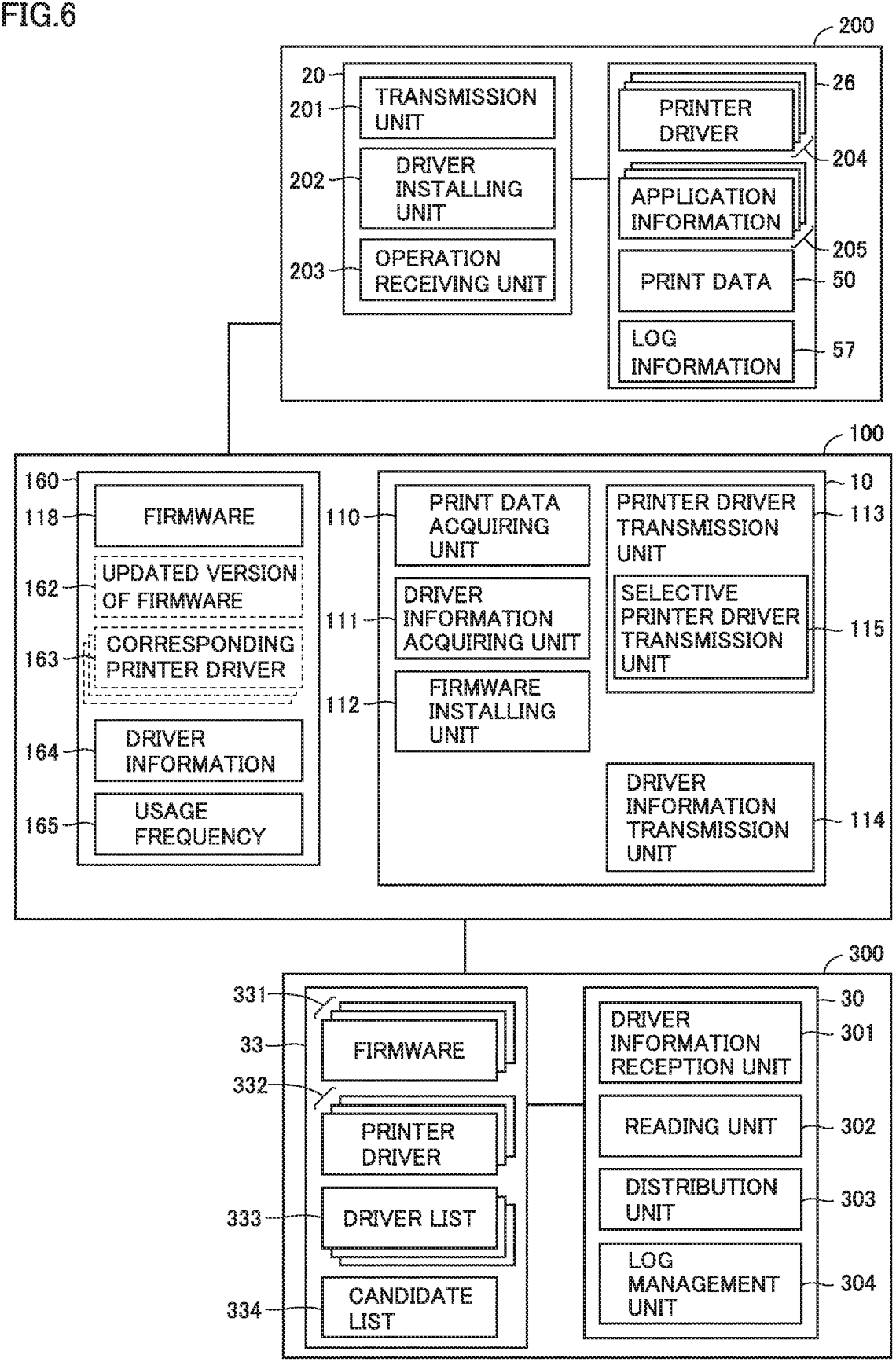
FIG. 6 is a diagram schematically showing an example of a configuration of functions of image formation apparatus 100, information processing device 200, and server 300 according to the present embodiment.

FIG. 6 is a diagram schematically showing an example of a configuration of functions of image formation apparatus 100, information processing device 200, and server 300 according to the present embodiment. Referring to FIG. 6, information processing device 200 includes a transmission unit 201, a driver installing unit 202, and an operation receiving unit 203, each of which is configured including a program executed by CPU 20. Storage unit 26 stores a plurality of types of printer drivers 204, a plurality of pieces of application information 205 and print data 50 generated by printer driver 204, and log information 57 including usage histories of the various types of printer drivers 204. Log information 57 will be detailed hereinafter.

In the present embodiment, the plurality of types of printer drivers 204 each correspond to a different one of the plurality of pieces of application information 205. Settings (e.g., sheet size, color/monochrome, etc.) are different for each type of printer driver 204. The user can selectively designate a type of printer driver 204 by operating console panel 25. The types of printer drivers 204 of information processing device 200 can include printer driver 204 with "standard" settings and printer driver 204 with settings "customized" by the user.

Transmission unit 201 transmits print data 50 of storage unit 26 to image formation apparatus 100. Driver installing unit 202 installs a distributed printer driver 204 in storage unit 26. As a result, an original printer driver in storage unit 26 is overwritten and updated by the distributed printer driver 204. Operation receiving unit 203 receives a user operation done to information processing device 200 via console panel 25. The user operation received by operation receiving unit 203 specifically includes an ID for the user to log in to information processing device 200, designation of a type of printer driver 204, an instruction to transmit print data 50 to image formation apparatus 100, and the like.

<G. Functional Configuration of Image Formation Apparatus 100>

With reference to FIG. 6, image formation apparatus 100 includes a print data acquiring unit 110, a driver information acquiring unit 111 that obtains driver information 164 described later, a firmware installing unit 112, a printer driver transmission unit 113 and a driver information transmission unit 114, each configured including a program executed by CPU 10. Further, in storage unit 160, firmware 118 is stored. Storage unit 160 also has an area for storing an updated version of firmware 118, which is indicated as an updated version of the firmware 162, a printer driver 163 corresponding to the updated version of the firmware 162, driver information 164, and usage frequency 165. Usage frequency 165 will be detailed hereinafter.

Print data acquiring unit 110 obtains (or extracts) print data 50 from data received from information processing device 200, and outputs it to image output unit 154. Driver information acquiring unit 111 obtains (or extracts) application information 205 (version data 54, type 55 and type 56 of the firmware) and user ID 53 from print data 50 received. Driver information 164 includes application information 205 and user ID 53.

Firmware installing unit 112 stores firmware 118 to storage unit 160, or when the updated version of the firmware 162 is distributed, firmware installing unit 112 stores it to storage unit 160. When firmware installing unit 112 stores firmware, firmware installing unit 112 may decompress data or the like so that CPU 10 can execute it. Further, when the updated version of the firmware 162 is distributed, firmware installing unit 112 may update firmware 118 by overwriting original firmware 118 with the updated version of the firmware 162.

Printer driver transmission unit 113 transmits the corresponding printer driver 163 in order to install it in information processing device 200. Printer driver transmission unit 113 includes a selective printer driver transmission unit 115 that selects and transmits corresponding one or more printer drivers 163 of a variety of types of printer drivers 204 to information processing device 200. In addition, driver information transmission unit 114 transmits to server 300 driver information 164 acquired by driver information acquiring unit 111.

When the updated version of the firmware 162 is stored in storage unit 160 (or the overwriting is performed), printer driver transmission unit 113 reads a corresponding printer driver 163 from storage unit 160 and transmits it to information processing device 200. In this way, when the updated version of the firmware 162 is installed in image formation apparatus 100, that is, when the original firmware 118 is updated, printer driver 163 corresponding to the updated version of the firmware 162 can be stored in information processing device 200 (for example, installed (or set in an executable state) as printer driver 204). Thus, a version of printer driver 204 installed in information processing device 200 can be matched with a version of firmware 118 installed in image formation apparatus 100 (that is, an updated version of the firmware).

<H. Functional Configuration of Server 300>

Referring to FIG. 6, server 300 includes a driver information reception unit 301, a reading unit 302, a distribution unit 303, and a log management unit 304 that manages log information 57, each of which is configured by a program executed by CPU 30.

Server 300 stores a group 331 of a plurality of types of firmware, a group 332 of a plurality of types of printer drivers, a driver list 333 corresponding to each image formation apparatus 100, and a candidate list 334 in an HDD 33 or the like of storage unit 34. The plurality of types of firmware of group 331 each indicate a different version. In addition, the plurality of types of printer drivers of group 332 also each indicate a different version. In candidate list 334, candidate firmware and printer drivers to be distributed by server 300 are registered.

The variety of types of firmware of group 331 are timely updated and thus provided by a manufacturer. By this provision, each firmware of group 331 is replaced with an updated version. The variety of types of printer drivers of group 332 are timely updated and thus provided by a manufacturer. By this provision, each printer driver of group 332 is replaced with an updated version. More typically, when it is updated includes when firmware 118 of image formation apparatus 100 is updated. Thus, in the present embodiment, each type of firmware of group 331 and each type of printer driver of group 332 can indicate a latest version.

Each unit of image formation apparatus 100, information processing device 200, and server 300 in FIG. 6 may be configured by a combination of a program executed by a CPU and a circuit such as an application specific integrated circuit (ASIC), a field-programmable gate array (FPGA) or the like.

<I. Configuration of Driver List>

Figure 7:
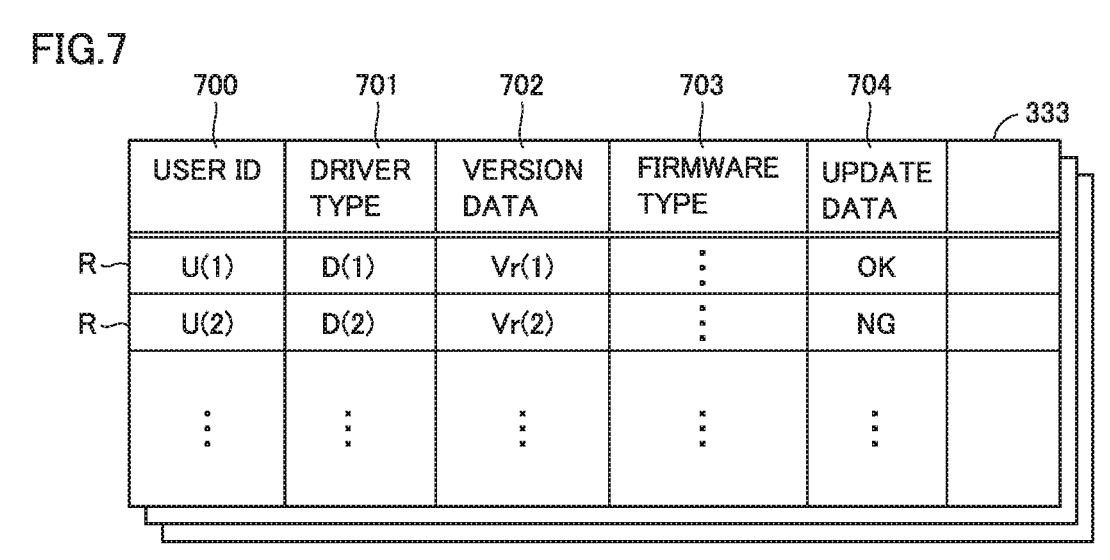

FIG. 7 is a diagram schematically showing an example of a configuration of driver list 333 according to the present embodiment. Referring to FIG. 7, each driver list 333 stores a record R in association with each type of printer driver 204 used in image formation apparatus 100 corresponding to thereto. Record R includes a user ID 700 for identifying a user of printer driver 204, a type 701 of printer driver 204, version data 702 indicating a version of printer driver 204, a type 703 of firmware corresponding to printer driver 204, and update data 704.

Specifically, CPU 30 stores user ID 53, version data 54, type 55, and type 56 of firmware of driver information 164 received by driver information reception unit 301 to driver list 333 as user ID 700, type 701, version data 702, and type 703.

Update data 704 indicates whether an updated version of a corresponding printer driver is stored in group 332. CPU 30 writes update data 704 to driver list 333. Specifically, when an updated version of a printer driver identified by a corresponding type 701 is provided by a manufacturer and stored in group 332, CPU 30 writes "OK" as update data 704 corresponding to type 701 of the updated version of the printer driver of driver list 333. If it is not yet provided, update data 704 remains "NG" (or "NG" is written).

When image formation apparatus 100 has firmware 118 updated, then, in order to distribute a printer driver corresponding to the updated version the firmware, reading unit 302 determines type 701 of the printer driver to be distributed from driver list 333 of image formation apparatus 100, and reads an updated version of the printer driver of the determined type and user ID 700 from group 332. Distribution unit 303 distributes the read updated version of the printer driver and the read user ID 700.

<J. Flowchart of Process>

When firmware is updated, a printer driver corresponding thereto is installed, as will now be described hereinafter with reference to FIG. 8, FIG. 9, FIG. 10 and FIG. 11. For the sake of simplicity, server 300 communicates with a single image formation apparatus 100 for the sake of illustration.

(J-1. Processing in Information Processing Device 200)

Figure 8:
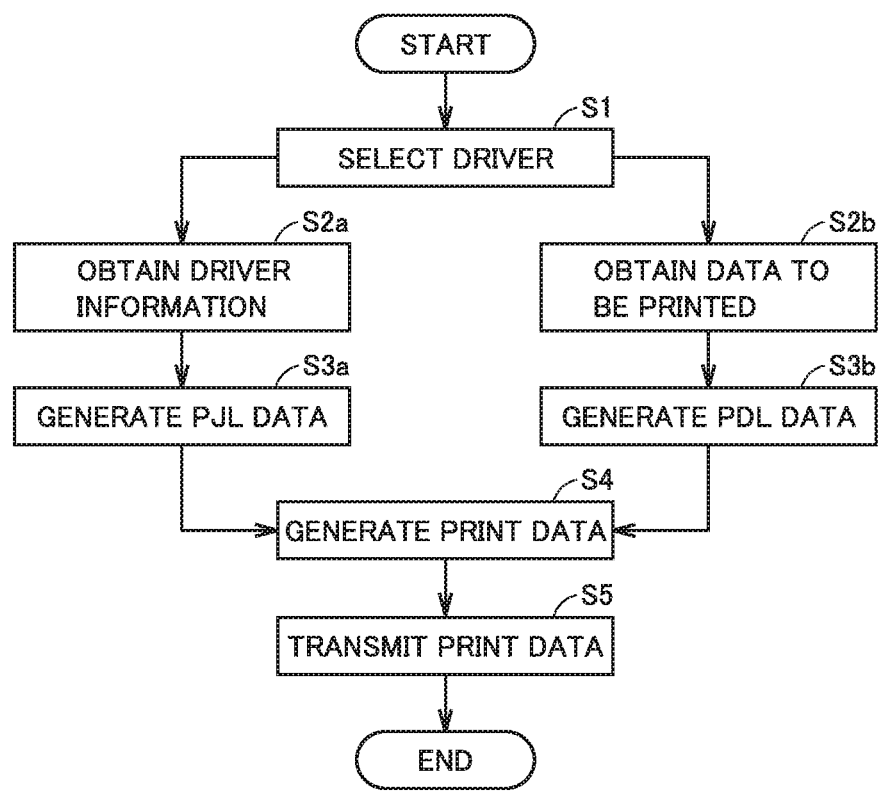
FIG. 8 is a flowchart showing an example of a process performed in information processing device 200 according to the present embodiment.

FIG. 8 is a flowchart showing an example of a process performed in information processing device 200 according to the present embodiment. CPU 20 of information processing device 200 periodically repeats the process of FIG. 8. Referring to FIG. 8, first, the user logs in to information processing device 200 and selects data to be printed and a type of printer driver 204 (step S1).

From application information 205 of printer driver 204 selected, CPU 20 obtains the type and version of the printer driver and a type of firmware 118 corresponding thereto (step S2a), and generates PJL data 51 including the obtained information (step S3a). Further, CPU 20 obtains the data designated by the user to be printed (step S2b), and generates PDL data 52 therefrom (step S3b). CPU 20 generates print data 50 (see FIG. 5) from the generated PJL data 51, the generated PDL data 52, and a user ID obtained when the user logged in (step S4). Transmission unit 201 of CPU 20 causes communication controller 27 to transmit print data 50 to image formation apparatus 100.

(J-2. Processing in Image Formation Apparatus 100)

Figure 9:
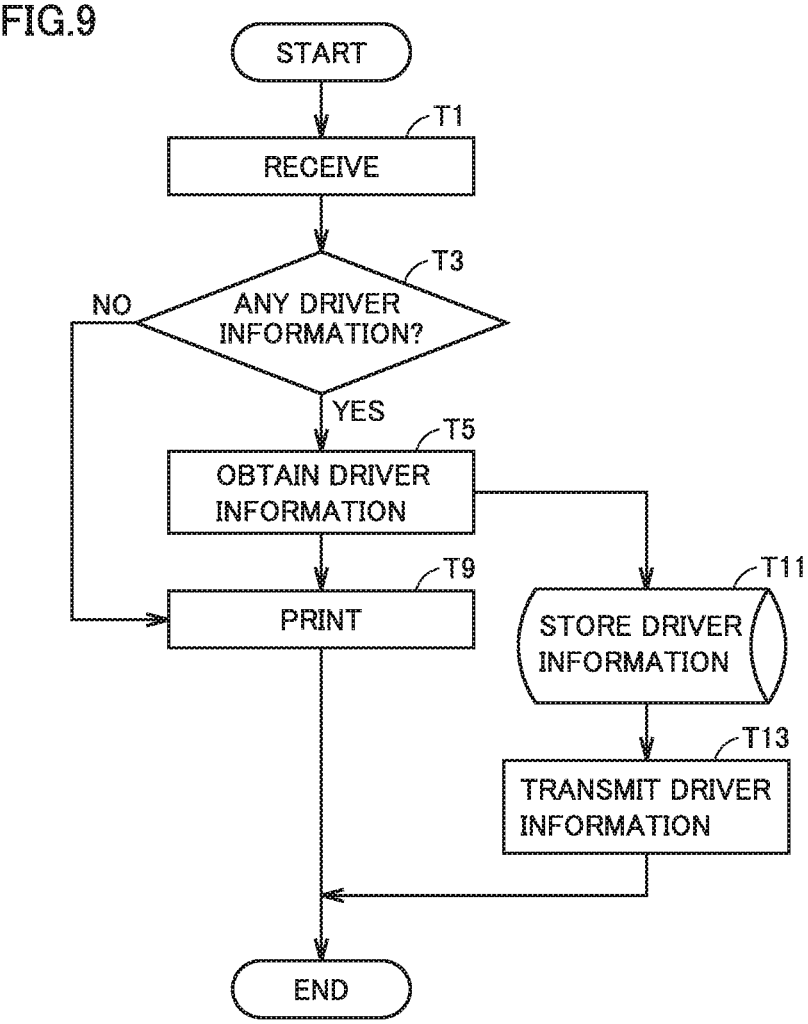
FIG. 9 is a flowchart showing an example of a process performed in image formation apparatus 100 according to the present embodiment.

FIG. 9 is a flowchart showing an example of a process performed in image formation apparatus 100 according to the present embodiment. CPU 10 of image formation apparatus 100 periodically repeats the process of FIG. 9. Referring to FIG. 9, print data acquiring unit 110 of image formation apparatus 100 causes communication circuit 175 to receive print data 50 transmitted from information processing device 200 (step T1).

Driver information acquiring unit 111 analyzes print data 50 received and determines from a result of the analysis whether the data includes driver information 164 (step T3). When driver information acquiring unit 111 determines that print data 50 does not include driver information 164 (NO in step T3), CPU 10 causes image output unit 154 to perform a printing process using print data 50 (step T9).

When driver information acquiring unit 111 determines that print data 50 includes driver information 164 (YES in step T3), driver information acquiring unit 111 obtains (or extracts) driver information 164 from print data 50 (step T5), and CPU 10 causes image output unit 154 to perform the printing process using print data 50 (step T9).

Furthermore, driver information acquiring unit 111 saves (or stores) the acquired driver information 164 to storage unit 160 (step T11). Driver information transmission unit 114 reads driver information 164 from storage unit 160 and causes communication I/F 156 to transmit the read driver information 164 to server 300 (step T13).

It should be noted that the process for printing print data 50 may not be performed in step T9, and instead be performed for example immediately before step T3. Furthermore, type 56 of firmware 118 may be obtained by image formation apparatus 100 rather than information processing device 200.

(J-3. Processing in Server 300)

Figure 10:
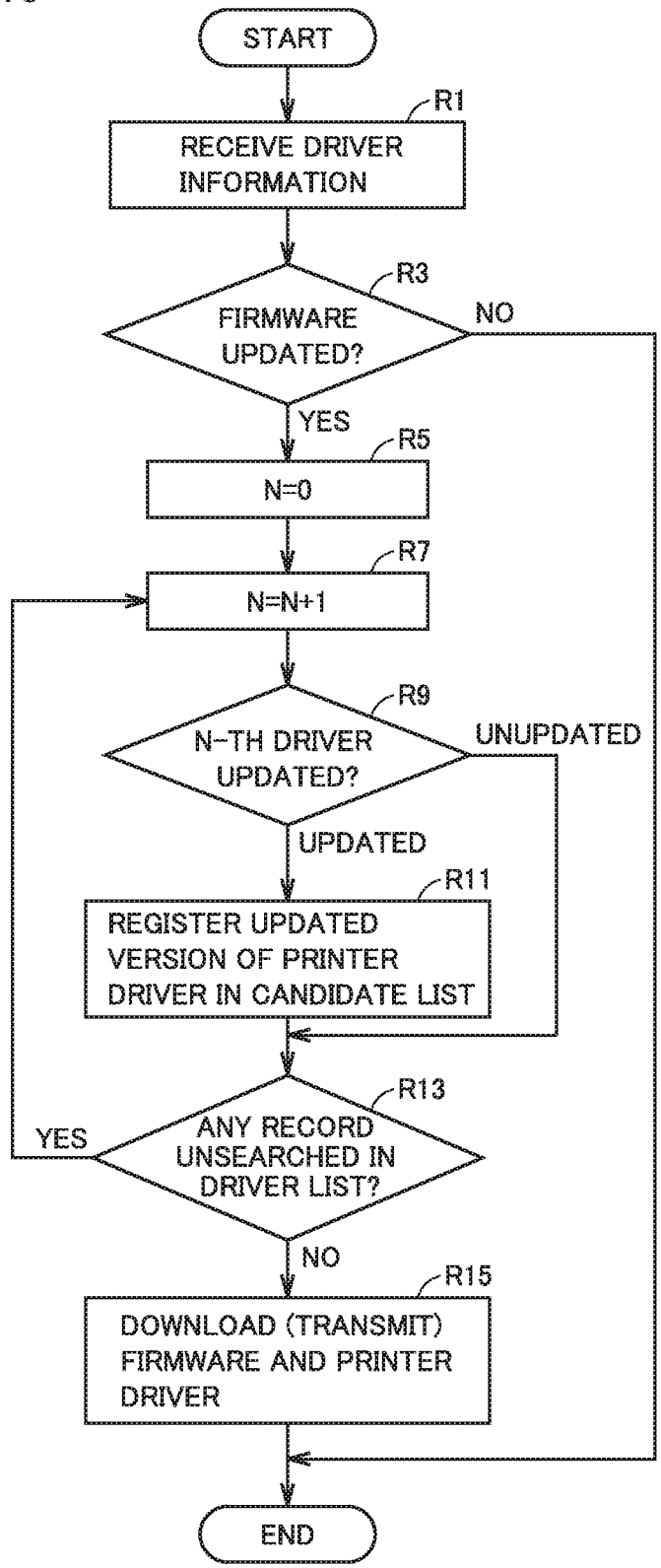
FIG. 10 is a flowchart showing an example of a process performed in server 300 according to the present embodiment.

FIG. 10 is a flowchart showing an example of a process performed in server 300 according to the present embodiment. CPU 30 of server 300 periodically repeats the process of FIG. 10. Referring to FIG. 10, driver information reception unit 301 of server 300 causes network controller 35 to receive driver information 164 transmitted from image formation apparatus 100 (step R1). Driver information reception unit 301 receives driver information 164 transmitted from image formation apparatus 100 and stores it as record R in driver list 333 corresponding to image formation apparatus 100.

Based on type 56 of firmware included in driver information 164, CPU 30 determines whether the firmware is updated (step R3). For example, CPU 30 determines it based on whether a notice of providing an updated version of the firmware indicated by type 56 is received from the provider of the firmware.

When CPU 30 determines that the firmware is updated (YES in step R3), the process shifts to step R5, otherwise (NO in step R3) CPU 30 ends the process.

When updating the firmware, CPU 30 sets a variable N to an initial value (for example of 0) (step R5), and increments variable N by 1 (step R7). Variable N is used to count record R in driver list 333.

CPU 30 determines from update data 704 of record R whether there has been provided an updated version of printer driver 204 that is specified in driver list 333 by the Nth record R as counted from the top of the list (step R9). When update data 704 indicates "NG," CPU 30 determines that the updated version of printer driver 204 has not yet been provided ("unupdated" in step R9) and shifts to step R13 described later.

On the other hand, when update data 704 indicates "OK," CPU 30 determines that the updated version of the printer driver is provided ("updated" in step R9), and CPU 30 reads record R of the updated version of the printer driver from driver list 333 and registers (or stores) it in candidate list 334 (step R11). CPU 30 determines from the value of variable N whether driver list 333 has its records Rs all searched (step R13). When CPU 30 determines that driver list 333 does not have its records Rs all searched (YES in step R13), the process returns to step R7.

In contrast, when CPU 30 determines that driver list 333 has its records Rs all searched (NO in step R13), reading unit 302 reads the updated version of the firmware from group 331 and also reads from group 332 a corresponding printer driver indicated by type 701 of each record R included in candidate list 334. Thus, one or more printer drivers corresponding to the updated version of the firmware are read from group 332. Distribution unit 303 causes network controller 35 to transmit the read updated version of the firmware and a corresponding printer driver to image formation apparatus 100 (step R15). In doing so, to the corresponding printer driver, user ID 700 of record R corresponding thereto is added. Thus when image formation apparatus 100 has firmware updated, server 300 can distribute an updated version of the firmware and a printer driver corresponding thereto.

(J-4. Distribution Process in Image Formation Apparatus 100)

Figure 11:
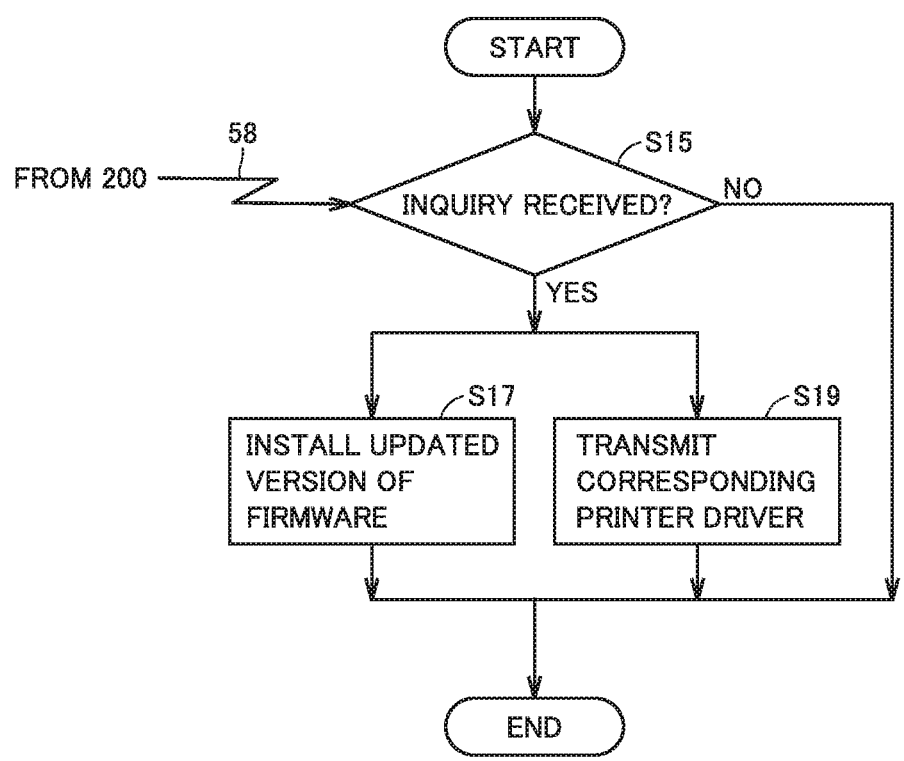
FIG. 11 is a flowchart showing an example of an installation process by image formation apparatus 100 according to the present embodiment.

FIG. 11 is a flowchart showing an installation process done by image formation apparatus 100 according to the present embodiment. CPU 10 of image formation apparatus 100 periodically performs the process of FIG. 11. A case will be described in which, in order for server 300 to provide distribution to information processing device 200 via image formation apparatus 100, image formation apparatus 100 receives the updated version of firmware 162 and a corresponding printer driver 163. CPU 10 receives the updated version of firmware 162 and the corresponding printer driver 163 from server 300 and stores them to storage unit 160.

Referring to FIG. 11, CPU 10 of image formation apparatus 100 determines whether an inquiry 58 is received in communication circuit 175 from driver installing unit 202 of information processing device 200 (step S15). Inquiry 58 is made to allow driver installing unit 202 to inquire of image formation apparatus 100 whether there is any corresponding printer driver 163 whenever print data 50 is transmitted or every day at a determined time (for example, when transmitting print data 50 on that day for the first time).

When inquiry 58 is not received (NO in step S15), CPU 10 ends the process, whereas when inquiry 58 is received (YES in step S15), firmware installing unit 112 installs the updated version of firmware 162 to storage unit 160 (Step S17). Thus image formation apparatus 100 has firmware 118 updated. This update can be done at a time, which includes a period of time for which image formation apparatus 100 is not used, for example.

Further, in order to install a received corresponding printer driver 163 in information processing device 200, printer driver transmission unit 113 causes communication circuit 175 to transmit the corresponding printer driver 163 together with a corresponding user ID 700 to information processing device 200 that is the inquirer (Step S19).

Driver installing unit 202 of information processing device 200 receives the corresponding printer driver 163 and installs it in association with the user ID 700. Thus when image formation apparatus 100 has firmware 118 updated, printer driver 204 of each user of information processing device 200 is updated to the corresponding printer driver 163.

As an exemplary variation of FIG. 11, steps T17 and T19 may be performed when it is determined that for any type of printer driver 204 of information processing device 200, printer driver 163 corresponding to the updated version of firmware 162 is stored in storage unit 160. As a result, when any type of corresponding printer driver 163 is distributable, any type of printer driver 204 of information processing device 200 is updated using a corresponding printer driver 163 when image formation apparatus 100 has firmware 118 updated.

The flowcharts of FIGS. 8 and 11 are stored to storage unit 160 of image formation apparatus 100 as a program, and the program is read and executed by CPU 10. The flowchart of FIG. 9 is stored to storage unit 26 of information processing device 200 as a program, and the program is read and executed by CPU 20. The flowchart of FIG. 10 is stored to storage unit 34 of server 300 as a program, and the program is read and executed by CPU 30.

Note that when the firmware is updated, information processing device 200 may be notified from image formation apparatus 100 that the corresponding printer driver 163 is distributable.

While in the processes of FIGS. 8 to 11 a case where image formation apparatus 100 communicates with a single information processing device 200 has been described, even in a case where image formation apparatus 100 communicates with a plurality of information processing devices 200, image formation apparatus 100 can collect from each information processing device 200 application information 205 (or driver information 164 including application information 205) corresponding to a variety of types of printer drivers 204 and transmit the collected information to server 300. Then, when image formation apparatus 100 has firmware updated, image formation apparatus 100 can receive from server 300 a corresponding printer driver 163 according to driver information 164 and transmit the received printer driver to each information processing device 200 for installation <K. Another Example of Print Data>

Figure 12:
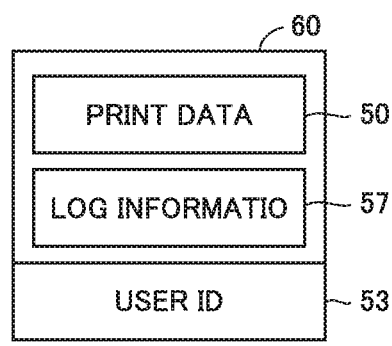
FIG. 12 is a diagram showing an example of test page print data according to the present embodiment.

FIG. 12 is a diagram showing an example of test page print data according to the present embodiment. In the present embodiment, server 300 manages log information indicating a usage history of printer driver 204. At a preset time CPU 10 of image formation apparatus 100 receives log information 57 and driver information 164 (application information 205 and user ID 53) of each printer driver 204 from information processing device 200, and transmits the received log information 57 and driver information 164 to server 300.

Thus image formation apparatus 100 can collect driver information 164 of each printer driver 204 when server 300 collects log information 57.

In the present embodiment, a variety of types of printer drivers 204 each accumulate a usage history thereof (an identifier of data to be printed, a date and time, a number of printed sheets, a result of execution (success/failure), and the like) whenever the printer driver is used, and store the accumulated usage history to storage unit 160 as log information 57. At a preset time (for example, periodically), each type of printer driver 204 generates test page print data 60 from the corresponding log information 57 and transmits the generated test page print data 60 to image formation apparatus 100. Image formation apparatus 100 prints out a test page and also collects log information 57 received. Image formation apparatus 100 transmits the collected log information 57 to server 300.

Referring to FIG. 12, test page print data 60 includes print data 50 of a test page predetermined as data to be printed, and log information 57. When test page print data 60 is transmitted to image formation apparatus 100, user ID 53 of printer driver 204 is added thereto. According to test page print data 60, when image formation apparatus 100 collects log information 57 of each printer driver 204, it is also possible to simultaneously collect driver information 164 including application information 205 and user ID 53 as set forth above.

<L. Exemplary Variation of Method of Distributing Corresponding Printer Driver 163>

In the present embodiment, selective printer driver transmission unit 115 selects one or more of printer drivers 163 received from server 300 that correspond to printer driver 204 having usage frequency 165 higher than a threshold value, that is, used highly frequently, and transmits the selected one or more corresponding printer drivers 163 to information processing device 200.

The criterion applied in selecting one or more corresponding printer drivers 163 is not limited to the usage frequency as set forth above. For example, for each type of printer driver 204, a period of time having elapsed since the latest usage date and time is managed. Selective printer driver transmission unit 115 selects one or more of corresponding printer drivers 163 received from server 300 that correspond to printer driver 204 having a longer period of time having elapsed since its latest usage date and time than a threshold value, that is, having a relatively long period of time having elapsed for which it is not used.

The management of usage frequency 165 or the elapsed time as described above, and the selection of a corresponding printer driver 163 may be performed by server 300.

<M. Program>

A program for causing image formation apparatus 100, information processing device 200 and server 300 to execute the above-described process is provided. Such a program at least includes a program according to the flowcharts shown in FIGS. 8 to 11. The program can also be stored on a flexible disk, a CD-ROM (Compact Disk-Read Only Memory), a ROM, a RAM, a memory card or a similar, computer readable storage medium that is an accessory of a computer of image formation apparatus 100, information processing device 200 and server 300, and thus provided as a program product. Further, it can also be stored in a storage medium such as a hard disk incorporated in a computer, and thus provided. Furthermore, the program can also be provided by downloading via a network. The program can be executed by one or more processors such as CPU, or by a combination of a processor and a circuit such ASIC, FPGA, etc.

Note that the program may invoke a required module of program modules provided as a portion of an operating system (OS) of a computer, in a prescribed sequence, as timed as prescribed, and may cause a processor to perform a process. In that case, the program per se does not include the above module and cooperates with the OS to perform the process. Such a program that does not include the module can also be included in the program according to the present embodiment.

Furthermore, the program according to the present embodiment may be incorporated in and provided as a portion of another program. The program in that case also per se does not include the module included in the other program and cooperates with the other program to cause a processor to perform a process. Such a program incorporated in another program can also be included in the program according to the present embodiment.

Although embodiments of the present invention have been described and illustrated in detail, it is clearly understood that the same is by way of illustration and example only and not limitation, the scope of the present invention should be interpreted by terms of the appended claims

What is claimed is:

1. A system comprising:
   an information processing device having a storage configured to store a cooperative application;
   one or more image formation apparatuses configured to operate in cooperation with the information processing device; and
   a server configured to
   distribute the cooperative application via the one or more image formation apparatuses,
   the one or more image formation apparatuses each including:
   a hardware processor;

a communication circuit configured to communicate with the information processing device;
a communication interface circuit configured to communicate with the server; and
a storage configured to store firmware,
wherein the cooperative application includes a plurality of types of cooperative applications, and
wherein the hardware processor is configured to:
manage a usage frequency of each of the plurality of types of cooperative applications;
receive, from the information processing device, application information which identifies the cooperative application of the information processing device;
when the firmware of an image formation apparatus is updated, receive, from the server for distribution to the information processing device, any type of the cooperative application identified by the application information and corresponding to an updated version of the firmware; and
transmit, to the information processing device, one or more of the plurality of types of cooperative applications, corresponding to the updated version of the firmware, that have a high usage frequency.

2. The image formation apparatus according to claim 1, wherein the cooperative application includes a cooperative application of a type customized by a user.

3. An image formation apparatus configured to operate in cooperation with an information processing device having a storage configured to store a cooperative application, comprising:
a hardware processor;
a communication circuit configured to communicate with the information processing device;
a communication interface circuit configured to communicate with a server which distributes the cooperative application via the image formation apparatus; and
a storage configured to store firmware,
wherein the cooperative application includes a plurality of types of cooperative applications, and
wherein the hardware processor is configured to:
manage a usage frequency of each of the plurality of types of cooperative applications;
receive, from the information processing device, application information which identifies the cooperative application of the information processing device;
when the firmware of the image formation apparatus is updated, receive, from the server, any type of the cooperative application identified by the application information and corresponding to an updated version of the firmware, and
transmit, to the information processing device, one or more of the plurality of types of cooperative applications, corresponding to the updated version of the firmware, that have a high usage frequency.

4. The image formation apparatus according to claim 3, wherein the hardware processor is further configured to:
receive from the information processing device data generated by the cooperative application;
and process the received, generated data by using the firmware.

5. The image formation apparatus according to claim 4, wherein
the generated data includes the application information, and the hardware processor obtains the application information from the generated data received.

6. The image formation apparatus according to claim 3, wherein
the server manages log information including a usage history of the cooperative application, and the hardware processor is further configured to:
receive the log information and the application information from the information processing device, and
transmit the received log information and application information to the server.

7. The image formation apparatus according to claim 3, wherein the hardware processor is further configured such that when the hardware processor receives any type of the cooperative application corresponding to the updated version of the firmware from the server, and receives an inquiry from the cooperative application of the information processing device, the hardware processor transmits to the information processing device, that is an inquirer, the received cooperative application corresponding to the updated version of the firmware.

8. A method for controlling an image formation apparatus configured to operate in cooperation with an information processing device having a storage configured to store a cooperative application, the image formation apparatus including:
a hardware processor;
a communication circuit configured to communicate with the information processing device;
a communication interface circuit configured to communicate with a server which distributes the cooperative application via the image formation apparatus, wherein the cooperative application includes a plurality of types of cooperative applications; and
a storage configured to store firmware, the method comprising:
managing, by the hardware processor, a usage frequency of each of the plurality of types of cooperative applications;
receiving, from the information processing device, application information which identifies the cooperative application of the information processing device;
when the firmware of the image formation apparatus is updated, receiving, from the server, any type of the cooperative application identified by the application information and corresponding to an updated version of the firmware, and
transmitting, to the information processing device, one or more of the plurality of types of cooperative applications, corresponding to the updated version of the firmware, that have a high usage frequency.

9. A non-transitory computer readable storage medium having a program stored thereon for causing a computer to perform the method according to claim 8.

* * * * *